United States Patent
Ohmori et al.

(10) Patent No.: US 7,466,342 B2
(45) Date of Patent: *Dec. 16, 2008

(54) METHOD OF NOTIFICATION OF INADEQUATE PICTURE QUALITY

(75) Inventors: Seishi Ohmori, Seongnam-si (KR); Jong-hum Park, Seoul (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/013,538

(22) Filed: Jan. 14, 2008

(65) Prior Publication Data

US 2008/0112589 A1    May 15, 2008

Related U.S. Application Data

(62) Division of application No. 10/731,240, filed on Dec. 9, 2003.

(30) Foreign Application Priority Data

Dec. 24, 2002    (KR) ................ 2002-83207

(51) Int. Cl.
 H04N 5/228    (2006.01)
 H04N 5/235    (2006.01)
 H04N 5/222    (2006.01)
(52) U.S. Cl. ............ 348/208.1; 348/208.4; 348/208.12; 348/208.15; 348/229.1; 348/333.04
(58) Field of Classification Search ............ 348/208.99, 348/208.1, 208.4, 208.5, 208.6, 208.13, 208.15, 348/333.04, 412.1, 413.1, 416.1, 417.1
See application file for complete search history.

(56) References Cited

U.S. PATENT DOCUMENTS

| | | | |
|---|---|---|---|
| 4,926,247 A | 5/1990 | Nagasaki et al. | |
| 5,264,940 A | 11/1993 | Komiya et al. | |
| 6,362,848 B1 | 3/2002 | Lohscheller et al. | |
| 6,546,116 B2 | 4/2003 | Brunk et al. | |
| 6,694,051 B1 | 2/2004 | Yamazoe et al. | |
| 6,765,619 B1 | 7/2004 | Deng et al. | |
| 6,825,884 B1 | 11/2004 | Horiuchi | |
| 7,079,702 B2 | 7/2006 | Watanabe et al. | |
| 7,280,149 B2 * | 10/2007 | Weintroub et al. | 348/349 |
| 7,286,177 B2 | 10/2007 | Cooper | |
| 7,339,613 B2 * | 3/2008 | Lee et al. | 348/208.99 |
| 2001/0010544 A1 | 8/2001 | Wakui | |

(Continued)

FOREIGN PATENT DOCUMENTS

JP    11-261946 A    9/1999

(Continued)

Primary Examiner—David L Ometz
Assistant Examiner—Richard M Bemben
(74) Attorney, Agent, or Firm—Drinker Biddle & Reath LLP

(57) ABSTRACT

In a digital camera including a digital signal processing portion processing a digital image and a display device displaying the image according to a digital signal from the digital signal processing portion, and a control portion controlling overall operation, after the user takes a picture, image data is analyzed by the digital signal processing portion to determine picture quality and, when it is determined that the picture quality is inadequate, the user is informed of information regarding the quality of the picture.

20 Claims, 7 Drawing Sheets

U.S. PATENT DOCUMENTS

2002/0064297 A1   5/2002   Brunk et al.
2003/0151674 A1   8/2003   Lin
2004/0101156 A1*  5/2004   Kacker ..................... 382/100
2006/0092474 A1   5/2006   Ramsay et al.

FOREIGN PATENT DOCUMENTS

JP   2000-165704 A   6/2000
KR   1997-0048900 A  7/1997

* cited by examiner

METHOD OF NOTIFICATION OF INADEQUATE PICTURE QUALITY

CROSS-REFERENCE TO RELATED PATENT APPLICATIONS

This patent application a divisional of U.S. patent application Ser. No. 10/731,240, filed Dec. 9, 2003, which claims the priority of Korean Patent Application No. 2002-83207, filed Dec. 24, 2002, in the Korean Intellectual Property Office, the disclosure of each is incorporated herein in its entirety by reference.

BACKGROUND OF THE INVENTION

1. Field of the Invention

The present invention relates to a digital camera and a control method thereof, and more particularly, to a digital camera capable of generating digital image data from a photograph, analyzing the picture quality of the image and notifying the user of inadequate picture quality, and a control method thereof.

2. Description of the Related Art

In typical digital cameras, such as the digital camera having the model name "Digimax 350SE," which is manufactured by Samsung Techwin Co., Ltd., a function to inform the user of inadequate picture quality after the user takes a photograph does not exist. Most typical digital cameras have a function that allows the user to review a photograph as soon as the photograph is taken. For example, when the user takes a picture, the image is displayed on a display device. However, most users do not recognize the picture quality is inadequate by using the above function and, moreover, do not use the function due to inconvenience. Thus, according to the typical digital cameras, when the user takes a picture of inadequate quality, he is not notified the picture is inadequate and therefore loses the photo opportunity by not retaking the picture.

SUMMARY OF THE INVENTION

The present invention is directed to a device that satisfies the need for a digital camera capable of notifying a user of inadequate picture quality so that the user can retake the picture, and a control method thereof.

An aspect of the present invention provides a digital camera, wherein, after the user takes a picture, image data is analyzed by the digital signal processing portion of the camera to determine the quality of the picture and, when it is determined that the picture quality is inadequate, the user is notified of information regarding the inadequate picture quality so the user may retake the picture.

Another aspect of the present invention provides a method of controlling the above digital camera where after a picture is taken, the digital signal processing portion analyzes the image data and determines the picture quality of the image, and if it is determined the picture quality is inadequate, informing the user of information regarding the inadequate picture quality so the user may retake the picture.

BRIEF DESCRIPTION OF THE DRAWINGS

The above and other features and advantages of the present invention will become more apparent by describing in detail preferred embodiments thereof with reference to the following description, claims, and attached drawings in which:

DETAILED DESCRIPTION OF THE INVENTION

Figure 1:
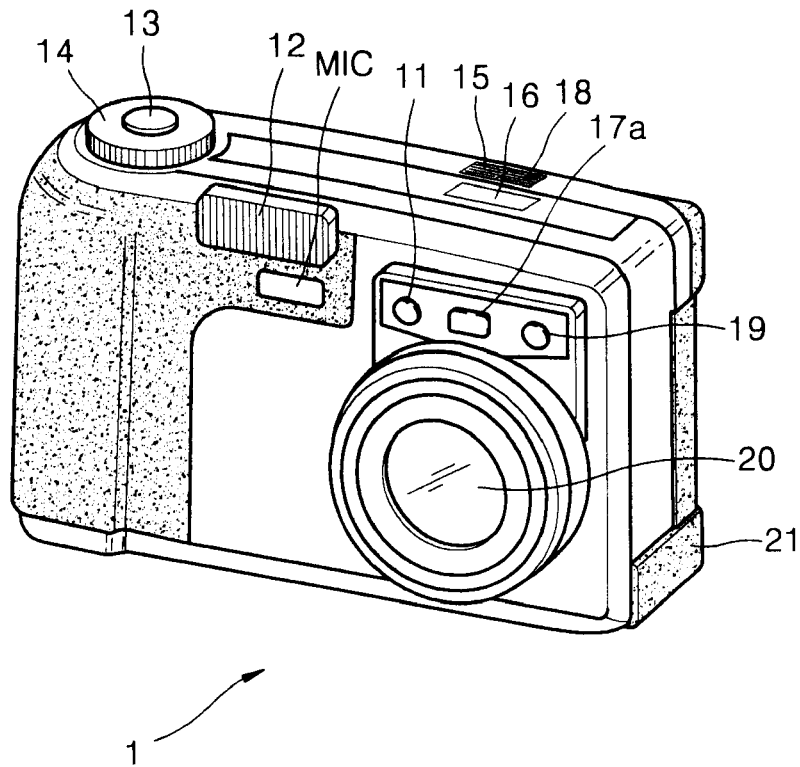
FIG. 1 is a perspective view illustrating the front and upper surfaces of a digital camera according to a preferred embodiment of the present invention.

Referring to FIG. 1, a microphone MIC, a self-timer lamp 11, a flash 12, a shutter button 13, a mode dial 14, a function selection button 15, an information display portion 16, a viewfinder 17a, a function block button 18, a flash light amount sensor 19, a lens portion 20, and an external interface portion 21 are provided in the front and upper surfaces of a digital camera 1 according to a preferred embodiment of the present invention.

The self-timer lamp 11 flickers in a self-timer mode during a set time after the shutter button 13 is pressed until the photographing starts. The mode dial 14 allows a user to set a variety of modes, for example, a still image mode, a night view mode, a motion picture mode, a reproduction mode, a computer connection mode, and a system setting mode. The function selection button 15 is used to select one of operational modes of the digital camera 1, for example, the still image mode, the night view mode, the motion picture mode, and the reproduction mode. The information display portion 16 displays information of the respective functions related to photographing. The function block button 18 is used to select each function displayed on the information display portion 16.

Figure 2:
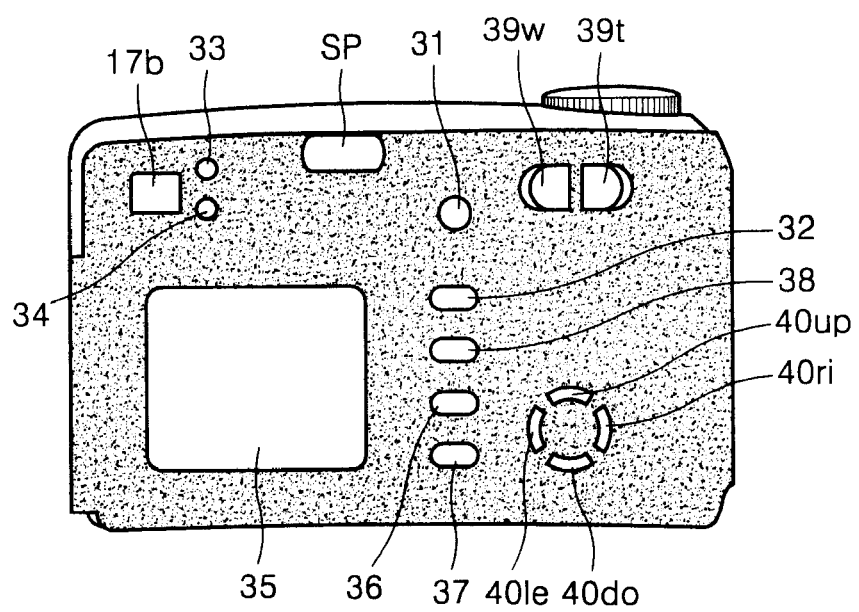
FIG. 2 is a view illustrating the rear side of the digital camera of FIG. 1.

Referring to FIG. 2, a representative voice button 42, a speaker SP, a power button 31, a monitor button 32, an auto-focus lamp 33, a viewfinder 17b, a flash ready lamp 34, a display panel 35, a confirm/delete button 36, an enter/play button 37, a menu button 38, a wide angle zoom button 39w, a telephoto zoom button 39t, an up movement button 40up, a right movement button 40ri, a down movement button 40do, and a left movement button 40le are arranged on the rear side of the digital camera 1 according to the present invention.

The monitor button 32 is used to control the operation of the display panel 35. For example, when the monitor button 32 is pressed once, an image of an object pictured and photographing information thereof are displayed on the display panel 35. When the monitor button 32 is pressed a second time, only an image of the pictured object is displayed on the display panel 35. When the monitor button 32 is pressed a third time, power applied to the display panel 35 is cut off. The auto-focus lamp 33 is operated when an input image is well focused. The flash ready lamp 34 is operated when the flash 12 of FIG. 1 is in a ready mode. The confirm/delete button 36 is used as a confirm button or a delete button in the process in which the user sets each mode. The enter/play button 37 is used to input data or for the function of stop or reproduction in a reproduction mode. The menu button 38 is used to display a menu of a mode selected by the mode dial 14. The up movement button 40up, the right movement button 40ri, the down movement button 40do, and the left movement button 40le are used in the process in which the user sets each mode.

The overall structure of the digital camera of FIG. 1 is described with reference to FIG. 3.

An optical system OPS including a lens portion and a filter portion optically processes light from a object to be taken. The lens portion in the optical system OPS includes a zoom lens, a focus lens, and a compensation lens.

An optoelectric converting portion OEC of a charge coupled device (CCD) or complementary metal-oxide-semiconductor (CMOS) converts light from the optical system OPS to an electric analog signal. A digital signal processor (DSP) 507 controls the operation of the OEC and an analog-to-digital converting portion. A correlation double sampler and analog-to-digital converter (CDS-ADC) device 501 as the analog-to-digital converting portion processes an analog signal from the optoelectric converting portion OEC to remove a high frequency noise and adjust amplitude thereof, and converts the processed analog signal to a digital signal, The DSP 507 generates a digital image signal classified by brightness and chromaticity signals, by processing the digital signal from the CDS-ADC device 501.

The digital image signal from the DSP 507 is temporarily stored in a DRAM 504. The algorithm and set data needed for the operation of the DSP 507 is stored in an EPROM 505. A memory card of a user is inserted in or detached from a memory card interface 506.

A digital image signal from the DSP 507 is input to a LCD driving portion 514 so that an image is displayed on the color LCD panel 35.

The digital image signal from the DSP 507 can be transmitted through a USB (universal serial bus) connection portion 21a and an RS232C interface 508 and a connection portion 21b thereof, as a serial communication, and a video filter 509 and a video output portion 21c, as a video signal.

An audio processor 513 outputs an audio signal from a microphone MIC to the DSP 507 or the speaker SP and outputs an audio signal from the DSP 507 to the speaker SP.

The user input unit INP includes the shutter button 13 of FIG. 1, the mode dial 14 of FIG. 1, the function selection button 15 of FIG. 1, the function block button 18 of FIG. 1, the monitor button 32 of FIG. 2, the confirm/delete button 36 of FIG. 2, the enter/play button 37 of FIG. 2, the menu button 38 of FIG. 2, the wide angle zoom button 39w of FIG. 2, the telephoto zoom button 39t of FIG. 2, the up movement button 40up of FIG. 2, the right movement button 40ri of FIG. 2, the down movement button 40do of FIG. 2, and the left movement button 40le of FIG. 2.

The microcontroller 512 controls the lens driving unit 510 and accordingly the zoom motor $M_Z$, the focus motor $M_F$, and the aperture motor $M_A$ respectively drive the zoom lens, the focus lens, and the aperture in the OPS. A light emitting portion LAMP driven by the microcontroller 512 includes the self-timer lamp 11, the auto focus lamp 33, and a flash ready lamp 34. The microcontroller 512 controls the operation of the flash controller 511 according to the signal from the flash light amount sensor 19.

In the control algorithm of the microcontroller 512, after photographing is performed according to the operation by the user, the image data obtained from the photographing operation is analyzed by the DSP 507 to determine whether the amount of exposure is appropriate there was camera movement during the picture taking. If it is determined that the amount of exposure is not appropriate or there was camera movement, the user is notified of the information, which will be described below.

Figure 3:
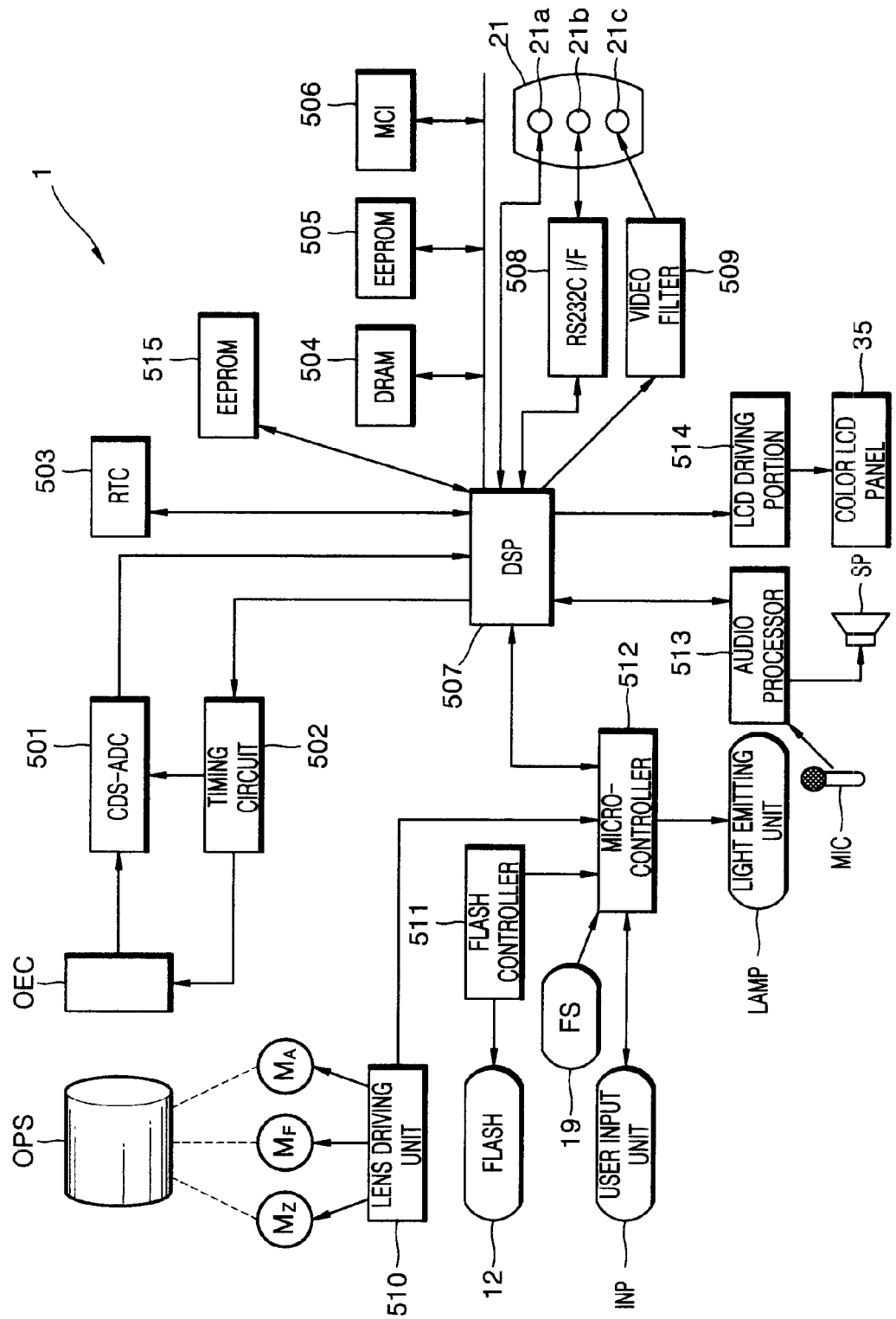
FIG. 3 is a block diagram illustrating the overall structure of the digital camera of FIG. 1.
Figure 4:
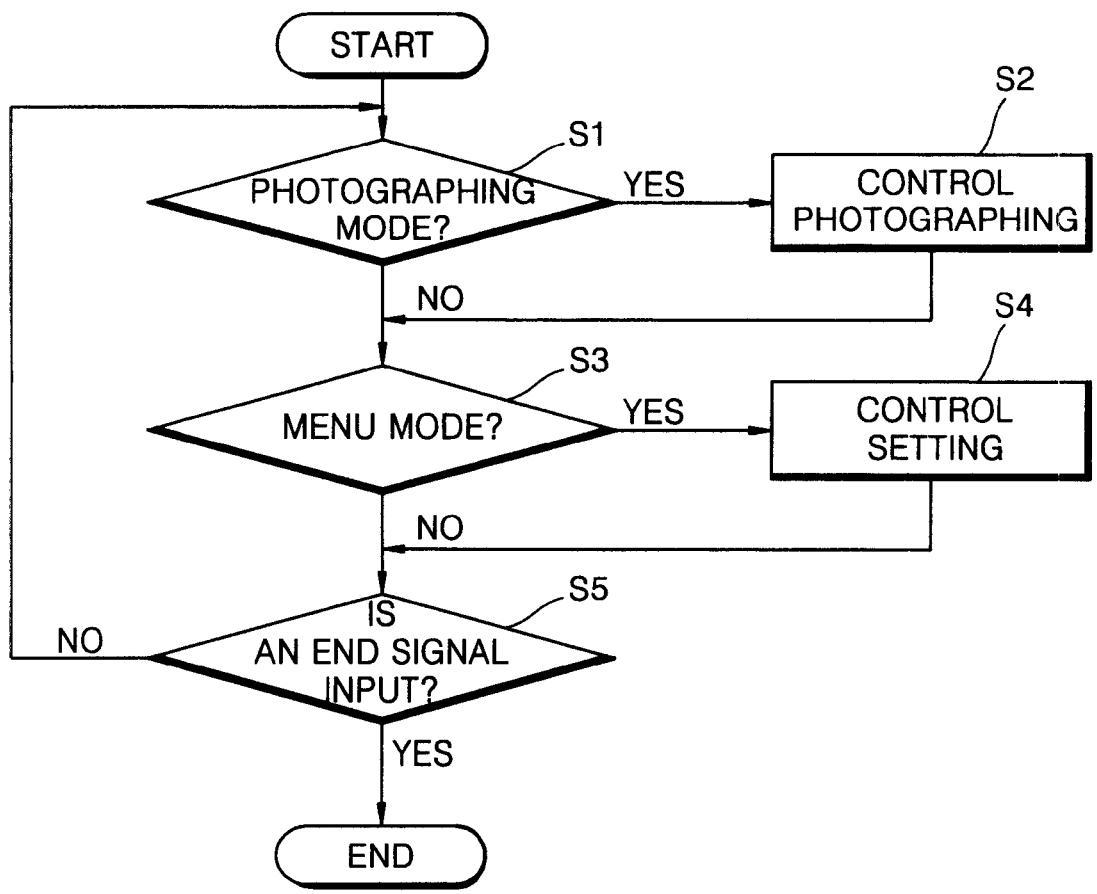
FIG. 4 is a flow chart for explaining the overall control algorithm of the microcontroller of FIG. 3.

FIG. 4 shows the overall control algorithm of the microcontroller 512 of FIG. 3. Referring to FIG. 4, the microcontroller 512 performs a photographing control step according to the operation of the user when a photographing mode is set by the user (Steps S1 and S2). When a menu mode is set by the user, a setting control step to set operational conditions of a camera according to the operation of the user (Step S3 and S4). The above steps are repeated until an external end signal is input (Step S5).

Figure 5:
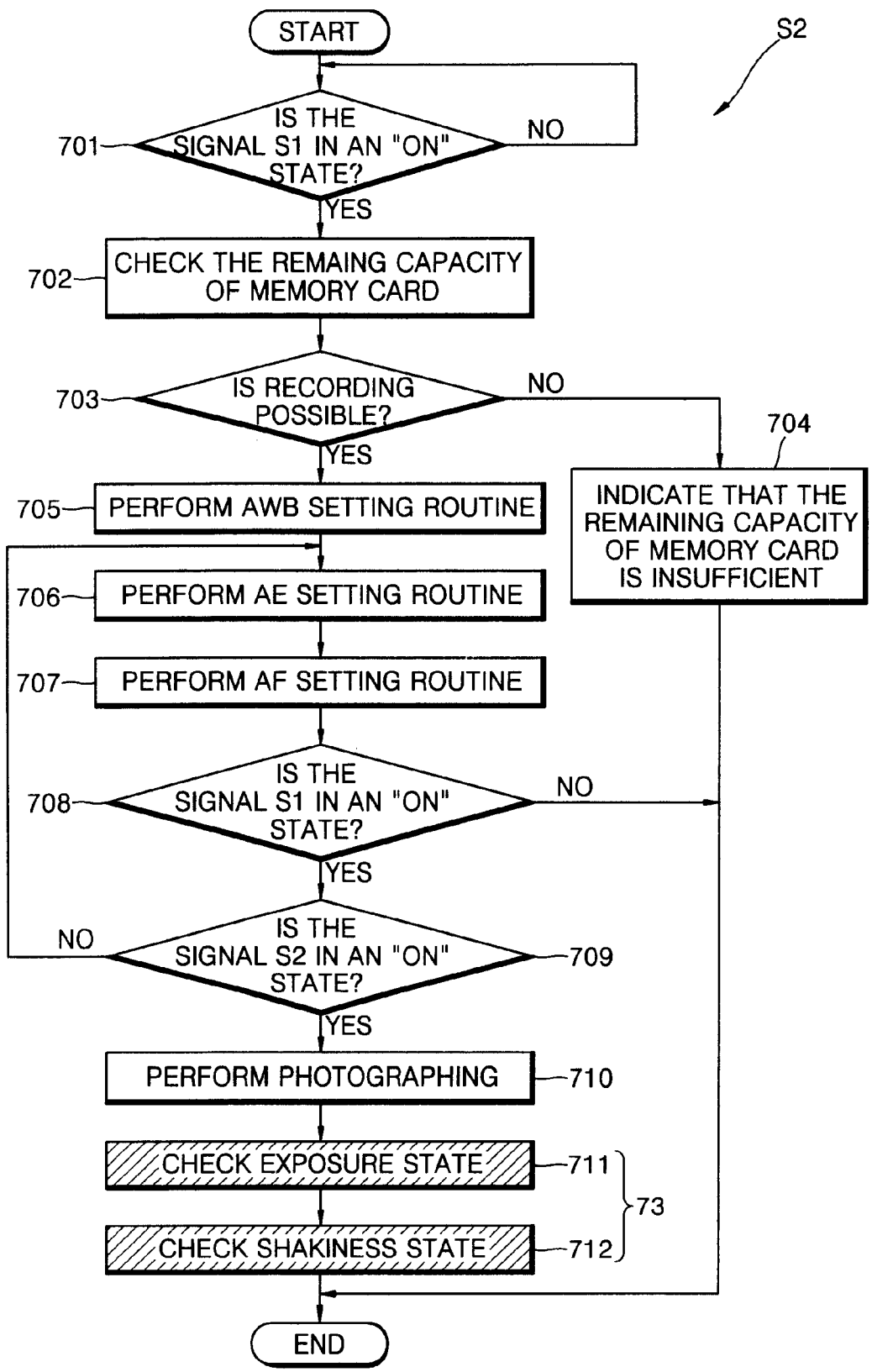
FIG. 5 is a flow chart for explaining the detailed algorithm of the photographing control step of FIG. 4.

FIG. 5 shows a detailed algorithm of the photographing control step S2 of FIG. 4. The shutter button 13 included in the user input unit INP has a two-step structure. That is, when a user presses the shutter button 13 to the first step after operating the wide angle zoom button 39w or telephoto zoom button 39t, a signal S1 from the shutter button 13 is turned on and, when the user presses the shutter button 13 to the second step, a signal S2 from the shutter button 13 is turned on. Thus, the photographing control algorithm of FIG. 5 starts when the user presses the shutter button 13 to the first step (Step 701).

Referring to FIGS. 3 and 5, in the algorithm of the photographing control (Step S2 of FIG. 5), when the signal S1 is turned on (Step 701), the remaining capacity of the memory card is checked (Step 702). Then, it is determined whether the remaining capacity of the memory card is sufficient for recording a digital image signal (Step 703). If the remaining capacity is not sufficient for recording, a message indicating the capacity of the memory card is not sufficient is displayed (Step 704).

If the remaining capacity is sufficient for recording, first, an automatic white balance (AWB) mode is performed to set related parameters (Step 705). Next, an automatic exposure (AE) mode is performed so that the amount of exposure with respect to incident luminance is calculated. Then, the aperture drive motor $M_A$ is driven according to the calculated exposure amount (Step 706). Next, an automatic focusing mode (AF) mode is performed, the present position of the focus lens FL is set (Step 707).

Next, whether the signal S1 that is a first step signal from the shutter button 13 is in an "ON" state is determined (Step 708). If the signal S1 is not in the "ON" state, since the user does not have an intention to take a photograph, the execution program is terminated. If the signal S1 is in the "ON" state, it is determined whether the signal S2 is in the "ON" state (Step 709). If the signal S2 is not in the "ON" state, since the user does not press the second step of the shutter button 13 to take a photograph, the execution program is moved to Step 706.

If the signal S2 is in the "ON" state, since the user presses the second step of the shutter button 13 to take a photograph, a photographing operation is performed (Step 710). That is, the microcontroller 512 operates the DSP 507 so that the optoelectric converting portion OEC and the CDS-ADC device 501 are operated by the timing circuit 502. Next, image data is converted and compressed by the digital signal processor 507. The compressed image file is stored in the memory card through the memory card interface 506.

Figure 8:
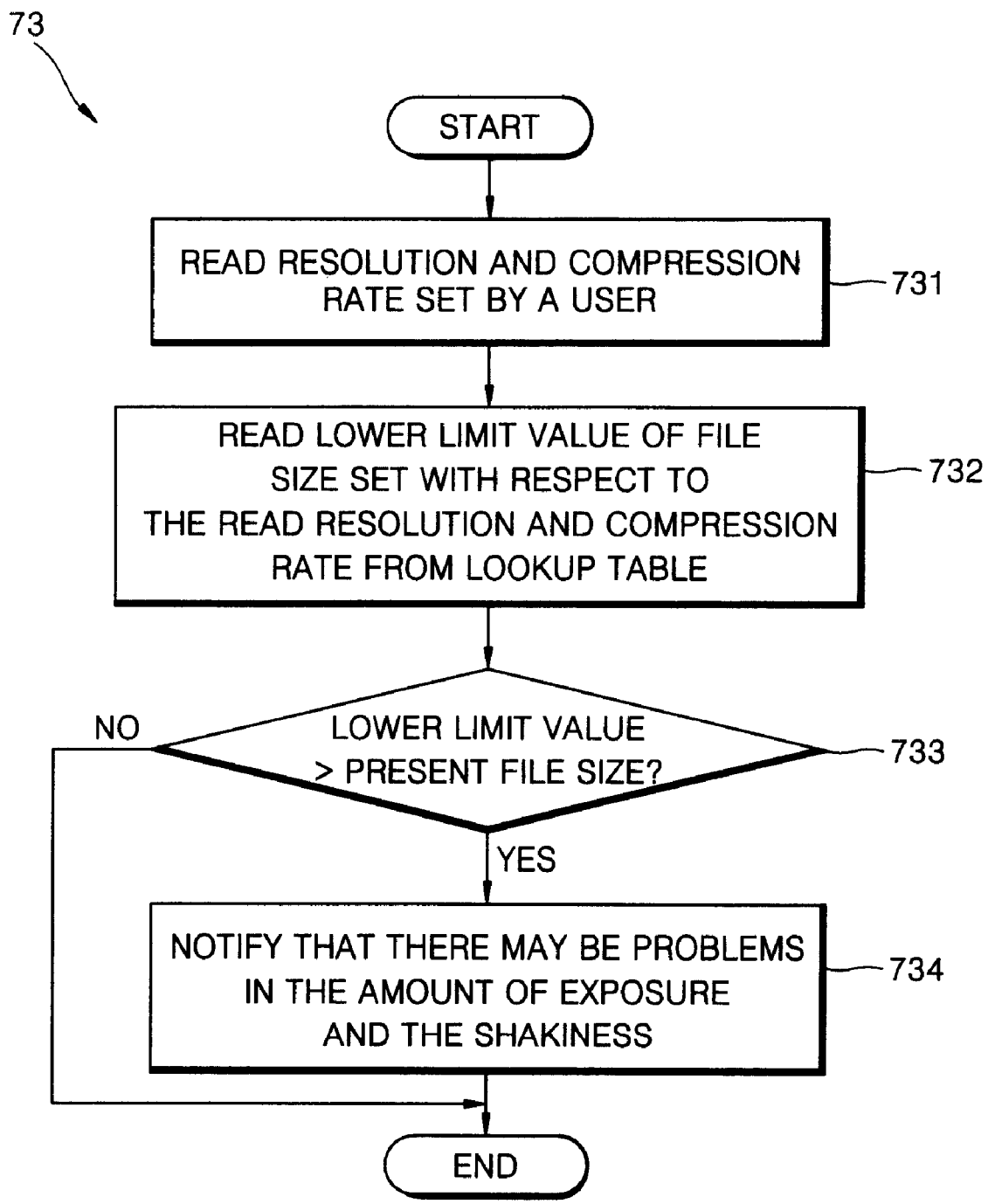
FIG. 8 is a flow chart for explaining the algorithm of the exposure and camera movement checking steps of FIG. 5.

Next, the image data obtained after taking a picture is analyzed by the DSP 507 so that the appropriateness of the amount of exposure and the presence of camera movement are determined. If it is determined that the amount of exposure is inappropriate or the camera was excessively moving during picture taking, the user is notified of the information (Step 73). In Step 73, an exposure state checking step (Step 711)

and a camera movement checking state (Step 712) are simultaneously performed according to the algorithm of FIG. 8. Alternatively, the exposure state checking step (Step 711) can be separately performed according to the algorithm of FIG. 6 while the camera movement checking state (Step 712) can be separately performed according to the algorithm of FIG. 8.

Figure 6:
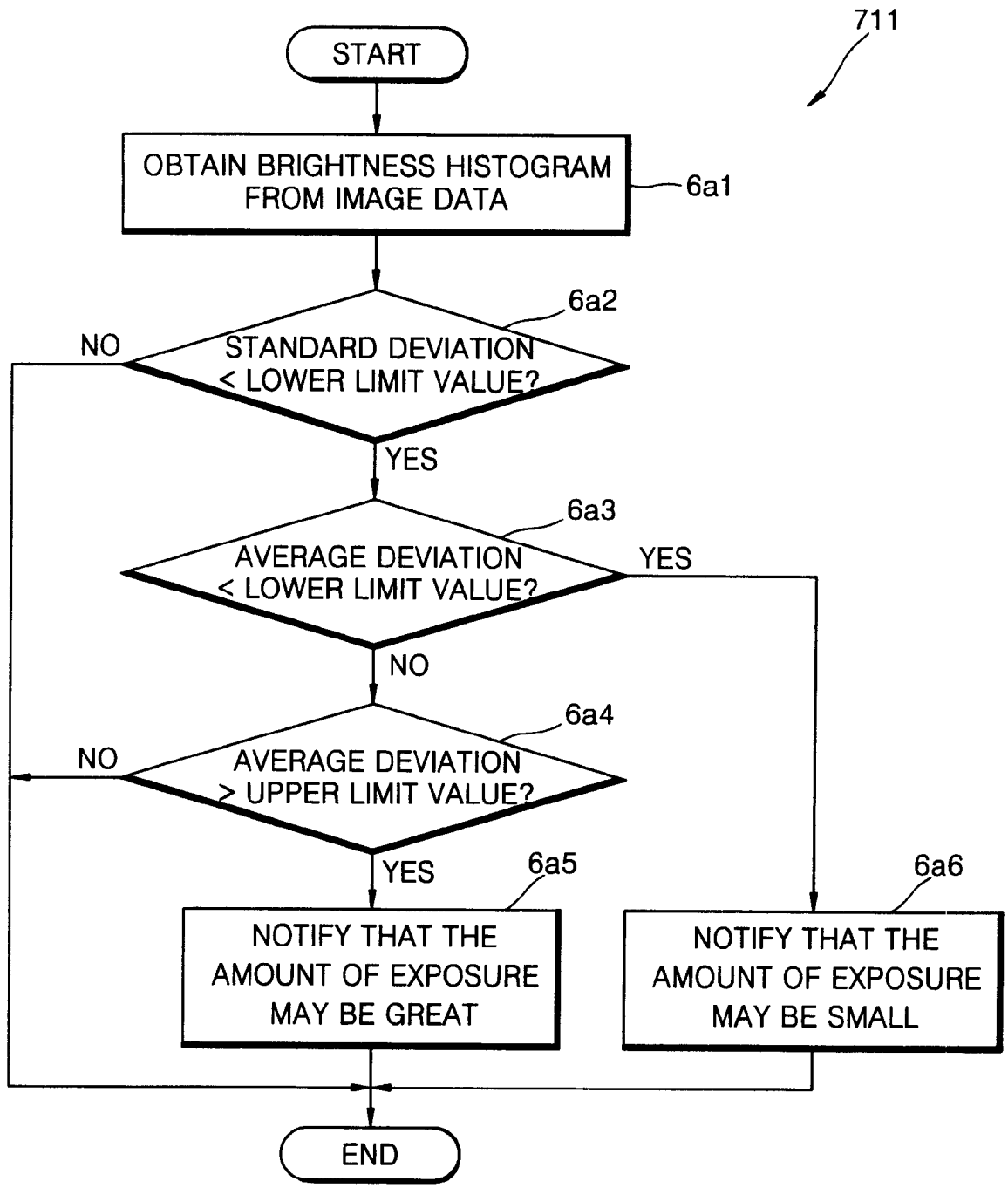
FIG. 6 is a flow chart for explaining the algorithm of the exposure state checking step of FIG. 5.
Figure 7A:
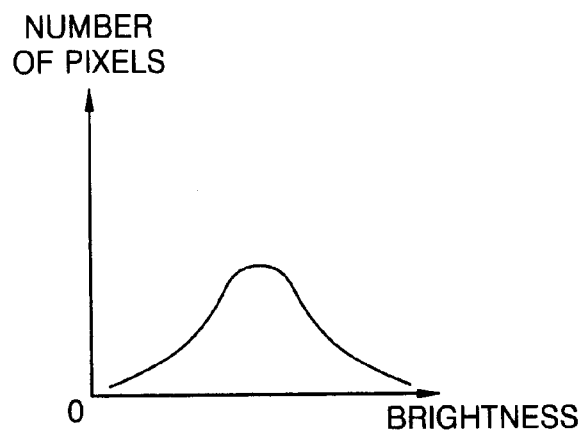
FIG. 7A is a graph showing a brightness histogram with respect to pixels when the amount of exposure is appropriate.
Figure 7B:
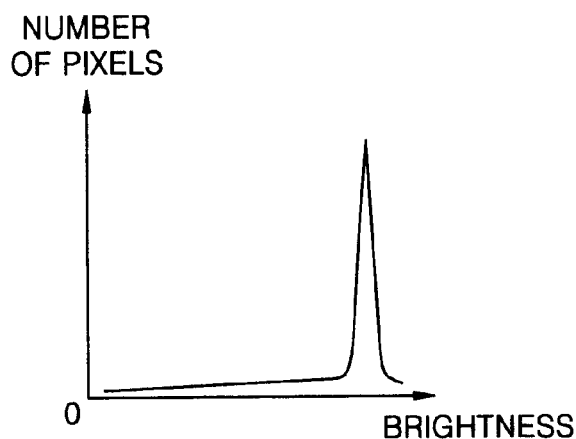
FIG. 7B is a graph showing a brightness histogram with respect to pixels when the amount of exposure is great.
Figure 7C:
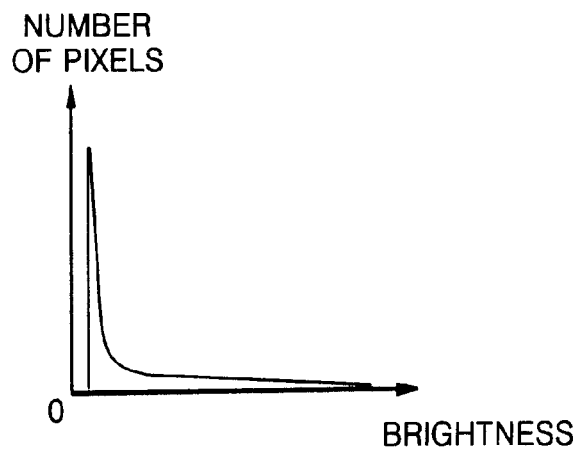
FIG. 7C is a graph showing a brightness histogram with respect to pixels when the amount of exposure is small.

FIG. 6 shows the algorithm of the exposure state checking step (Step 711) of FIG. 5. FIG. 7A shows a brightness histogram with respect to pixels when the amount of exposure is appropriate. FIG. 7B shows a brightness histogram with respect to pixels when the amount of exposure is great. FIG. 7C shows a brightness histogram with respect to pixels when the amount of exposure is small. The algorithm of the exposure state checking step (Step 711) is described below with reference to FIGS. 6 through 7C.

First, a brightness histogram is obtained with respect to pixels of the obtained image data (Step 6a1). In the obtained brightness histogram, when a standard deviation in brightness is not less than a set lower limit value, since the amount of exposure is appropriate as shown in FIG. 7A, the program is terminated (Step 6a2). When the standard deviation in brightness is less than the set lower limit value and an average brightness is greater than a set upper limit value (step 6a4), a user is notified that the amount of exposure may be great, as shown in FIG. 7B (Step 6a5). Also, when the standard deviation in brightness is less than the set lower limit value (Step 6a2) and the average brightness is less than a set lower limit brightness value (step 6a3), the user is notified that the amount of exposure may be small, as shown in FIG. 7C (Step 6a6). However, even when the standard deviation in brightness is less than the set lower limit value, if the average brightness is not less than the set lower limit brightness value and no more than the set upper limit value, the amount of exposure is determined to be appropriate so that the program is terminated (Steps 6a2 through 6a4).

Referring to FIG. 8, the step 73 of simultaneously checking exposure state and the camera movement state is described below.

First, a resolution and compression rate of an image set by a user are read (Step 731). A lower limit value of a file size preset with respect to the read resolution and compression rate is read from a lookup table (Step 732). The lower limit values of the file size are set with respect to a pair of the resolution and compression rate which can be set by the user and by a difference between an average file size and a standard deviation thereof with respect to sample images.

In detail, assuming that the average file size of the sample images is Afs, the standard deviation thereof is Asd, a lower limit value of the file size is Cref, and an adjustment coefficient to adjust the lower limit value Cref by various conditions is a, the lower limit value Cref of the file size is determined by Equation 1.

$$Cref = Afs - a \times Asd \quad \text{[Equation 1]}$$

Examples of "average file size Afs (kilo-byte)/Standard deviation Asd (kilo-byte)" of the sample images with respect to the pairs of the resolution and compression rate which can be set by the user are shown in Table 1.

TABLE 1

|  | Low Resolution | Mid-Resolution | High Resolution |
|---|---|---|---|
| Low Compression Rate | 190/60 | 380/70 | 800/160 |
| Mid-Compression Rate | 100/30 | 200/50 | 400/80 |
| High Compression Rate | 70/20 | 120/30 | 300/60 |

In the lookup table shown in Table 1, a half million auxiliary pixel numbers are applied for the low resolution, one million auxiliary pixel numbers are applied for the mid-resolution, and two million auxiliary pixel numbers are applied for the high resolution. When the adjustment coefficient a is set to "2" in Equation 1, the lookup table of the lower limit values Cref (kilo-byte) of the file size according to the data of Table 1 is shown Table 2.

TABLE 2

|  | Low Resolution | Mid-Resolution | High Resolution |
|---|---|---|---|
| Low Compression Rate | 70 | 240 | 480 |
| Mid-Compression Rate | 40 | 100 | 240 |
| High Compression Rate | 30 | 60 | 180 |

For example, when the user selects the high resolution and the mid-compression, the lower limit value of the file size is determined as 240 kilo-bytes.

Next, when the present file size of the image data is smaller than the lower limit value of the file size, the user is notified that there may be problems in the exposure amount and the excessive camera movement (Steps 733 and 734). For example, when the user selects the high resolution and the mid-compression, that is, when the lower limit value of the file size determined from the lookup table of Table 2 is 240 kilo-bytes, assuming that the sizes of the respective image files are as shown in Table 3, the user is notified that the second and twenty-fourth images files FS2 and FS24 may have problems with picture quality.

TABLE 3

| FS1(304) | FS6(276) | FS11(301) | FS16(406) | FS21(443) | FS26(361) |
| FS2(224) | FS7(294) | FS12(343) | FS17(361) | FS22(303) | — |
| FS3(274) | FS8(671) | FS13(385) | FS18(495) | FS23(374) | — |
| FS4(297) | FS9(641) | FS14(490) | FS19(388) | FS24(170) | — |
| FS5(359) | FS10(424) | FS15(333) | FS20(473) | FS25(327) | — |

While this invention has been particularly shown and described with reference to preferred embodiments thereof, it will be understood by those skilled in the art that various changes in form and details may be made therein without departing from the spirit and scope of the invention as defined by the appended claims.

As described above, in the digital camera according to the present invention and a control method thereof, the user is notified of problems in the amount of exposure and camera movement when the picture was taken, allowing the user the opportunity to retake the picture.

What is claimed is:

1. A method of determining inadequate quality in a digital image, the method comprising:
   ascertaining the resolution and the compression rate of the digital image;
   ascertaining a lower limit file size value appropriate for the ascertained resolution and compression rate;
   comparing the file size of the digital image with the ascertained lower limit file size value; and
   if the digital image file size is less than the ascertained lower limit file size value, determining that an exposure amount in the digital image may be inadequate.

2. A method of determining inadequate quality in a digital image captured by a digital camera, the method comprising:
   ascertaining the resolution and the compression rate of the digital image;

ascertaining a lower limit file size value appropriate for the ascertained resolution and compression rate;

comparing the file size of the digital image with the ascertained lower limit file size value; and if the digital image file size is less than the ascertained lower limit file size value, determining that the digital camera suffered from excessive movement while capturing the digital image.

3. The method of claim 1, the method further comprising:

if the digital image file size is less than the ascertained lower limit file size value, displaying a notification indicating that the quality of the digital image may be inadequate.

4. A method of determining inadequate quality in a digital image, the method comprising:

ascertaining the resolution and the compression rate of the digital image;

ascertaining a lower limit file size value appropriate for the ascertained resolution and compression rate;

comparing the file size of the digital image with the ascertained lower limit file size value;

if the digital image file size is less than the ascertained lower limit file size value, determining that the quality of the digital image may be inadequate; and if the digital image file size is less than the ascertained lower limit file size value, displaying a notification indicating that an exposure amount in the digital image may be inappropriate.

5. The method of claim 2, further comprising:

if the digital image file size is less than the ascertained lower limit file size value, displaying a notification indicating that the digital camera suffered from excessive movement while capturing the digital image.

6. A method of determining inadequate quality in a digital image, the method comprising:

ascertaining the resolution and the compression rate of the digital image;

ascertaining a lower limit file size value appropriate for the ascertained resolution and compression rate;

comparing the file size of the digital image with the ascertained lower limit file size value; and if the digital image file size is less than the ascertained lower limit file size value, determining that the quality of the digital image may be inadequate, wherein the lower limit file size value for a particular resolution and compression rate is determined by taking the difference between an average file size value of sample images at the same resolution and compression rate and an adjustment coefficient multiplied by the standard deviation of the sample images at the same resolution and compression rate.

7. A method of determining inadequate quality in a digital image, the method comprising:

ascertaining the resolution and the compression rate of the digital image;

ascertaining a lower limit file size value appropriate for the ascertained resolution and compression rate;

comparing the file size of the digital image with the ascertained lower limit file size value; and if the digital image file size is less than the ascertained lower limit file size value, determining that the quality of the digital image may be inadequate, wherein the lower limit file size values are found in a lookup table.

8. The method of claim 7, wherein the lookup table contains lower limit file size values for particular resolutions and compression rates.

9. The method of claim 1, wherein the digital image is taken by a digital camera.

10. The method of claim 1, wherein the method is performed by a digital camera.

11. The method of claim 10, wherein the digital camera comprises a digital signal processor that performs the method.

12. The method of claim 4, wherein the digital image is taken by a digital camera.

13. The method of claim 4, wherein the method is performed by a digital camera.

14. The method of claim 13, wherein the digital camera comprises a digital signal processor that performs the method.

15. The method of claim 6, wherein the digital image is taken by a digital camera.

16. The method of claim 6, wherein the method is performed by a digital camera.

17. The method of claim 16, wherein the digital camera comprises a digital signal processor that performs the method.

18. The method of claim 7, wherein the digital image is taken by a digital camera.

19. The method of claim 7, wherein the method is performed by a digital camera.

20. The method of claim 19, wherein the digital camera comprises a digital signal processor that performs the method.

\* \* \* \* \*